United States Patent [19]

Feldman, Jr.

[11] Patent Number: 4,513,732
[45] Date of Patent: Apr. 30, 1985

[54] PASSIVE INTEGRAL SOLAR HEAT COLLECTOR SYSTEM

[76] Inventor: Karl T. Feldman, Jr., 1704 Stanford Dr., N.E., Albuquerque, N. Mex. 87106

[21] Appl. No.: 543,243

[22] Filed: Oct. 19, 1983

Related U.S. Application Data

[63] Continuation-in-part of Ser. No. 298,085, Nov. 10, 1981, abandoned.

[51] Int. Cl.³ .............................................. F24J 3/02
[52] U.S. Cl. ..................................... 126/433; 126/434; 126/435; 126/437; 126/446; 165/104.11
[58] Field of Search .............. 126/434, 433, 445, 446, 126/450, 438, 432; 165/104.11, 10 A

[56] References Cited

U.S. PATENT DOCUMENTS

| | | | |
|---|---|---|---|
| 3,996,919 | 12/1976 | Hepp | 126/434 |
| 4,000,851 | 1/1977 | Heilemann | 126/422 |
| 4,084,578 | 4/1978 | Ishibashi | 126/434 |
| 4,119,085 | 10/1978 | Knowles et al. | 126/438 |
| 4,127,105 | 11/1978 | Watt | 126/446 |
| 4,131,158 | 12/1978 | Abhat | 126/436 |
| 4,153,041 | 5/1979 | Grauleau et al. | 126/434 |
| 4,182,409 | 1/1980 | Robinson, Jr. | 126/400 |
| 4,217,882 | 8/1980 | Feldman, Jr. | 126/433 |
| 4,311,131 | 1/1982 | Sabet | 126/433 |
| 4,315,498 | 2/1982 | Devin et al. | 126/433 |
| 4,334,120 | 6/1982 | Yamano et al. | 126/443 |

FOREIGN PATENT DOCUMENTS

| | | | |
|---|---|---|---|
| 2734521 | 2/1979 | Fed. Rep. of Germany | 126/433 |
| 2456918 | 1/1981 | France | 126/433 |
| 134248 | 10/1980 | Japan | 126/433 |
| 42058 | 4/1981 | Japan | 126/433 |

Primary Examiner—James C. Yeung
Attorney, Agent, or Firm—Leonard C. Brenner

[57] ABSTRACT

The present invention relates to an improved apparatus for collecting, absorbing, transferring, and storing solar heat energy, economically and passively, without pumps or electric power. The apparatus comprises a solar collector with a flat finned heat pipe absorber and an attached integral insulated storage tank with a double wall heat exchanger. The absorber, made of one or more slightly tilted gravity assisted heat pipes with flat absorber fins, absorbs and transfers solar heat by evaporation, vapor transport, and condensation to the slightly elevated heat storage tank. The one or more heat pipes turn on when the sun is shining and turn off automatically when the sun is not shining.

2 Claims, 10 Drawing Figures

PASSIVE INTEGRAL SOLAR HEAT COLLECTOR SYSTEM

BACKGROUND OF THE INVENTION

This application is a continuation-in-part of Ser. No. 298,085, now abandoned, which was filed on Nov. 10, 1981 by Karl T. Feldman, Jr.

This invention relates to a passive apparatus for collecting, absorbing, transferring and storing solar heat economically without pumps or electric power. The apparatus comprises a solar collector with a flat finned heat pipe absorber and an integrally attached insulated storage tank. The novelty of this apparatus lies in the combination of the flat finned heat pipe absorber and the attached insulated storage tank to achieve a completely passive integral solar heat collector system, and the recognition of the fact that a simple mechanical attachment of the condenser end of the heat pipe absorber to the storage tank provides adequate thermal conductivity to permit the operation of the subject apparatus for its intended purpose.

The heat pipe, disclosed by G. M. Grover in 1963 in U.S. Pat. No. 3,229,759, describes the transfer of heat at high rates over long distances with low temperature drop. Since 1963, many useful applications of the heat pipe have been conceived, and some of these are in the field of solar energy.

The applicant, in U.S. Pat. No. 4,217,882, issued Aug. 19, 1980, discloses a passive heat pipe solar collector. Here a concentrating collector was described for focusing the sun onto a gravity assisted heat pipe which in turn transfers the heat into an attached insulated storage tank. Also in pending application, Ser. No. 228,072, titled "Improved Passive Solar Heat Collector," the applicant describes an improved concentrating heat pipe collector including the use of photovoltaic cells on the heat pipe cooled absorber, improvements in the heat removal and storage means, a tracking mechanism, and a special flat version of the concentrating collector.

M. W. Frank in U.S. Pat. No. 3,875,926 for a "Solar Thermal Energy Collection System," describes a gravity assisted heat pipe that is part of a well insulated, interconnected and hermetically sealed solar heat collection, transfer, and storage system. A longitudinal concentrating collector, of a polar axis tracking type, is employed to focus solar heat onto a heat pipe absorber which is connected to a remote storage tank. A liquid return pump is required for some versions of this system.

P. S. Hepp, in U.S. Pat. No. 3,996,919, "System for Collecting and Storing Solar Energy," describes a flat plate or parabolic dish concentrator that heats the top end of a heat pipe which transfers heat downward a short distance into a heat storage reservoir or air flow stream.

J. W. Ramsey, et al., in U.S. Pat. No. 3,799,144, describes a heat pipe solar collector for driving an aerospace refrigeration system. Here a wicked heat pipe absorbs and transfers heat from a concentrating dish type solar collector to a Vuilleumier cycle cryogenic refrigerator.

C. J. Bennett, in U.S. Pat. No. 4,080,957, "Solar Panel," describes a flat plate heat pipe solar absorber located within an evacuated collector. The gravity assisted heat pipes (reflux condensers or two-phase thermosyphons) transfer solar heat to a heat exchanger jacket where heat is transferred to a pumped fluid. No storage means is attached.

F. P. Fehlner, et al., in U.S. Pat. No. 4,067,315, describes a "Solar Heat Pipe" which is a transparent glass heat pipe with a black wick which absorbs solar heat directly in the heat pipe. No storage means is attached.

G. W. Knowles, et al., in U.S. Pat. Nos. 4,059,093 and 4,119,085, both titled "A Solar Energy Collector," describes a concentrating collector and a finned heat pipe absorber enclosed in an evacuated glass tube. The heat pipe transfers heat to a heat exchanger with a pumped liquid. No storage means is attached. Further, in the latter of the Knowles, et al. patents, in FIG. 1, the inventors teach the use of a flange 34 attached to the condenser end of the heat pipe 32, a dry thermal interface 44, and a mating member 36 which is attached to a fluid manifold 38, elements 34, 36, and 44 all being bolted together or clamped to provide good thermal conductivity. Applicant has determined that simple mechanical contact between the condenser end of the heat pipe and the heat exchanger is adequate to remove heat at a rate commensurate with what can be supplied by the heat pipe extracting solar energy. Knowles, et al. therefore teaches away from the instant invention.

D. Granleau, et al., in U.S. Pat. No. 4,153,041, titled "Solar Energy Collector," describes a wicked heat pipe absorber enclosed in an evacuated glass tube. No heat removal or storage means is described.

J. M. Cutchaw, in U.S. Pat. No. 3,923,038, titled "Solar Energy Collector Panel," describes a large flat glass heat pipe with a large flat wick inside. Solar heat is absorbed in the wick, evaporation occurs, and hot vapor flow to the condenser located around the perimeter, which consists of a finned tube with a pumped liquid inside. No integral storage means is described.

D. S. Ward, in U.S. Pat. No. 4,267,825, titled "Solar Heat Collector with Heat Pipes," describes a passive solar heat collector with moveable heat pipes and an integral water storage tank which is connected to a water source heat pump for space heating or cooling.

In "Application of Heat Pipes to Solar Collectors," by W. B. Bienert, et al., Proceedings of the 10th IE-CEC, Paper No. 759224, August 1975, and in "Heat Pipes Applied to Flat Plate Solar Collectors," by W. B. Bienert, NSF-RANN Workshop on Solar Collectors for the Heating and Cooling of Buildings, Nov. 21-23, 1974 New York, N.Y., the authors describe the use of heat pipes in both concentrating solar collectors and in flat plate collectors. In these articles, heat is removed from the collectors by a pumped liquid and no integral storage means is envisioned.

Two other patents, German Patent No. DT2734-521, "Solar Energy Absorption System Using Heat Pipes—Having Air Cooling Fans and Ducts to Avoid Overheating In Hot Sunshine If Power Failure Occurs," issued to K. Weller on Feb. 15, 1979, and U.S. Pat. No. 4,311,131, "Evacuated Heatpipe Solar Collector," issued to Faramarz M. Sabet on Jan. 19, 1982, teach unnecessarily complicated heat transfer apparatus to transfer heat from the heat pipe to the vessel being heated. Weller, for example, describes the use of an heat transfer element 19 in FIGS. 3a–g. Weller also teaches the insertion of the condenser end 11a of the heat pipe 11 into the vessel to be heated 20. Sabet teaches an elaborate heat exchanger in FIG. 12 of his patent.

Most of the solar collectors described above require the use of a pumped liquid to remove heat from the collector. Also most of these collectors do not use an attached integral heat storage tank.

SUMMARY OF THE INVENTION

The present invention relates to an improved passive apparatus for collecting, absorbing, transferring, and storing solar energy as heat. The apparatus is a complete solar heating system comprising a solar collector with a flat finned heat pipe absorber and an integrally attached insulated heat storage tank. Because the collector and heat pipe absorber are slightly tilted, solar energy is absorbed and transferred to the upper end of the one or more absorber heat pipes, where it is transferred directly into the attached insulated heat storage tank. The gravity assisted heat pipes transfer the heat rapidly and efficiently into the elevated tank (but not out of it) without the need for pumps or electric power. Thus, the solar collector system operates efficiently without pumps, controls, sensors, trackers, or electricity.

The primary object of this invention is to provide a highly reliable passive solar heat collector that can be manufactured at low cost. Another object is for the solar heat to be collected efficiently and with fast time response. Another object of the invention is for the solar heat to be collected and stored within the integral storage means of the system. Another object of the invention is for the solar heat to be collected and stored passively, without the need for pumps, controls, sensors, trackers, or electricity. Another object of this invention is for the flat heat pipe absorber to be coupled to the outside of the bottom of the heat storage tank to provide a double wall heat exchanger that is easily assembled.

In its preferred embodiment, the passive solar heat collector has a flat heat pipe absorber of at least one heat pipe with a transparent cover on top and insulation beneath. The collector is tilted and the heat pipes extend beyond the upper end of the collector. The end of the heat pipe in the collector is known as the first end and the upper end extending beyond the collector is the second end. The insulated storage tank, known as the heat removal and storage means, is in direct mechanical contact with the second ends of the heat pipes, the heat pipes being wrapped around the bottom of the tank in one embodiment of my invention. The tank has inlet and outlet pipes so that cold liquid can flow into the bottom of the tank, come into contact with the heated bottom of the tank and be heated, and then the hot liquid can be pushed out through the outlet pipe. The tank can also be filled with a phase change material which melts when heated and freezes when cooled. The tank is provided with highly effective external thermal insulation to minimize heat losses.

The operation of the passive solar heat collector begins when solar energy strikes the collector. The sun passes through the transparent cover of the collector box and is absorbed on the surface of the metal absorber. The absorber surface is coated with a black paint of selective surface to maximize solar radiation but minimizes re-emitted heat losses. Heat is conducted through the metal absorber and transferred into the heat pipe where it evaporates the liquid in the heat pipe. The hot vapor that is generated flows out of the heated evaporator section into the upper end of the heat pipe that is attached to the bottom of the cold liquid filled tank. The hot vapor condenses inside the upper end of the heat pipe and transfers the latent heat of vaporization through the wall of the tank into the liquid inside the tank. The condensate liquid flows down the titled heat pipe and returns to the heated evaporator section where it is reevaporated. A wick, such as screen mesh or circumferential screw threads, may be provided on the inside wall of the heat pipe to wet all of the inside wall of the pipe and enhance evaporation and condensation.

One directional heat transfer results, since the heat pipes transfer heat into the water in the integral heat storage tank when the sun shines, but do not transfer it out when the sun is not shining, due to the fact that when the lower evaporator end cools all the liquid runs to the bottom of the pipe and the heat transfer stops. Thus, the tilted gravity assisted heat pipes provide highly effective heat transfer into the heat storage tank when the sun is shining, but turn off when the sun is not shining, providing sensitive and rapid passive automatic control of the system and eliminating the need for active electric powered controls, sensors, and pumps. Also, by using a nonfreezing liquid in the heat pipes, such as a fluorocarbon refrigerant, methanol, or acetone, the passive solar heat collector is freeze protected.

The integral heat storage tank is located at the upper end of the tilted collector. However, only a few degrees of tilt is needed and the collector may be oriented with the heat pipes either on a north-south axis or on its side with the heat pipes on an east-west axis. Only approximate orientation toward the south is needed since the flat collector is highly tolerant to orientation. With the collector lying on its side and the heat pipes along an east-west axis, the heat storage tank may be located behind the collector and the condenser ends of the heat pipes may be bent to lay against the tank. The collector and the integral heat storage tank need to be held together in their proper orientation by a support structure.

The absorber is a flat plate of thermally conducting metal attached to the heat pipes; both may be made of copper, aluminum or other cost-effective material. Each heat pipe may have its own absorber fins, say 6 to 12 inches wide, or one wider sheet with several heat pipes may be used. An aluminum or other metal extrusion with the heat pipe formed within it may be used. Here, an axial grooved wick may be extruded into the heat pipe. Another approach is to use a flat fin aluminum (or other metal) extrusion with a slot that snaps onto one or more separate heat pipes. Another approach is to use a flat metal fin that has been roll formed of at least one sheet so that it fits onto one or more separate heat pipes. Another approach is to make the absorber from flat bonded metal panels that have the heat pipes formed within it.

When the cold water inlet of the passive solar heat collector system is connected directly to a cold water supply under pressure, and the hot water outlet is connected to a hot water load, such as a domestic hot water system, the solar heating system is completely passive, and no pumps, sensors, controls, or electricity are needed. The cold water flows into the bottom of the storage tank where it comes into contact with the heated bottom section and is heated. The hot water then rises to the top of the tank and is drawn off from the hot water outlet near the top of the tank whenever a hot water faucet is opened downstream. Thus, the passive solar heat collector system serves as a water preheater. Because the system is simple, efficient, freeze protected, has no moving parts, and is completely passive, it is highly reliable, requires little or no maintenance and is economical to manufacture and cost-effective to operate.

The invention, both to its organization and method of operation, together with further objects and advantages thereof, will be understood by reference to the following specifications taken in connection with the accompanying drawings, in which.

Figure 1:
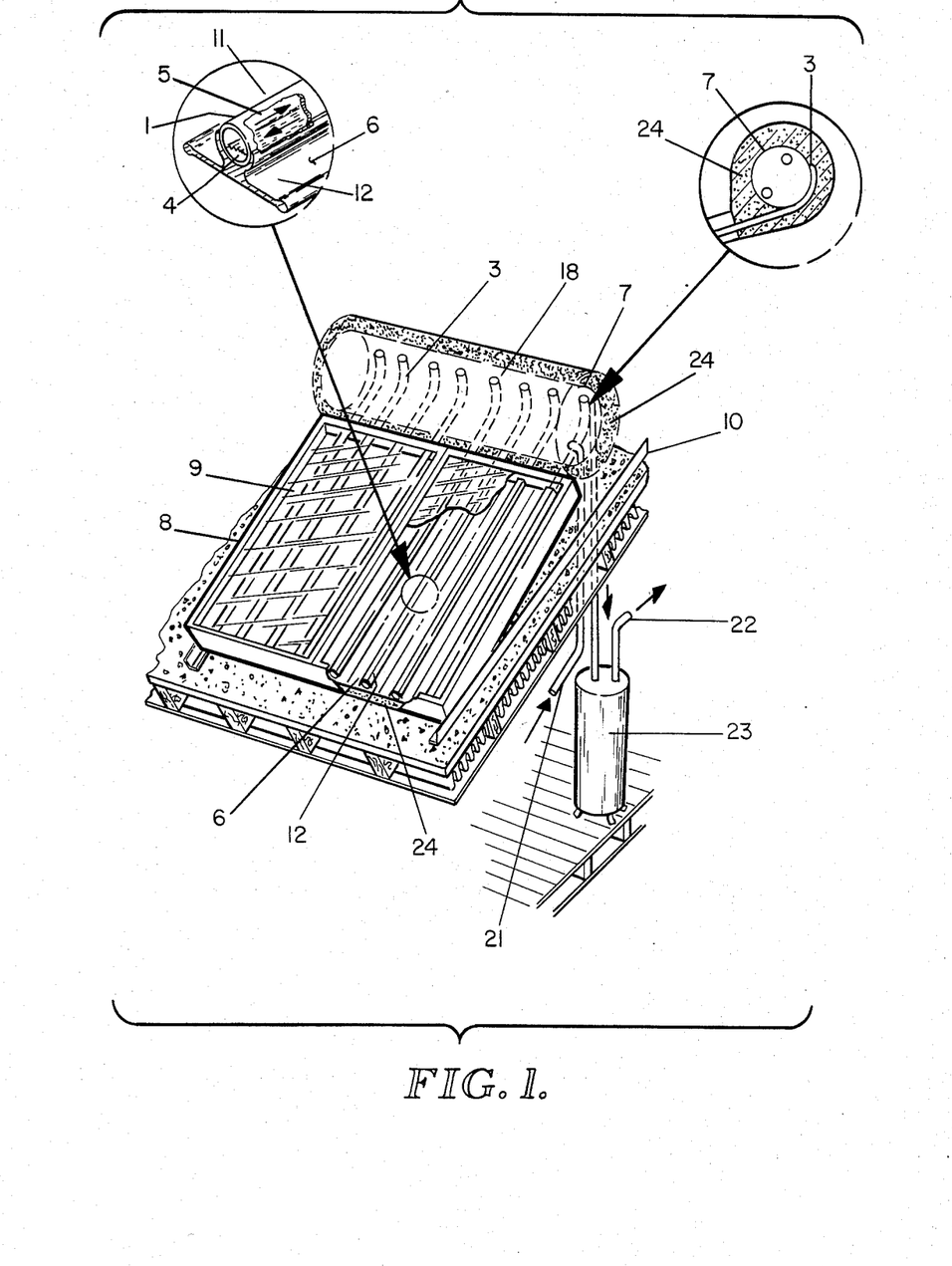
FIG. 1 is an isometric drawing of the passive solar heating system.

Referring now to the drawings and particularly to FIG. 1, where the passive solar heating apparatus is there illustrated with a plurality of tilted gravity assisted heat pipes 1, each with its lower first end, serving as a heat absorber section or evaporator 2, located in the solar heat collector 8. The upper second end of each heat pipe 1 serves as a condenser 3, and is situated in close mechanical contact along the bottom of the heat removal and storage means 7, where heat is removed and stored. Each heat pipe 1 is evacuated of air and is partially filled with a liquid 4 and its vapor 5. Solar energy falling on the collector 8 passes through a transparent cover 9 and is absorbed by the absorber 6. The absorber 6 is a metal surface coated with an effective solar absorber material. The solar heat absorbed is transferred by conduction through the absorber 6 into the heat pipes. Here the liquid 4 evaporates in the heated evaporator 2 and the hot vapor 5 flows to the condenser 3, where it condenses, giving up its latent heat of vaporization to the heat removal and storage means 7. Liquid 4 formed when the vapor 5 condenses in the condenser 3 returns to the evaporator with the aid of gravity. Also, the heat pipes 1 may have a wick 11 on the inside wall where surface tension forces acting in the pores of the wick 11 distribute liquid around the inside of the heat pipe 1 to enhance evaporation and condensation. Axial grooves, circumferential grooves or porous metal wicks 11 may be used. The liquid pumping capability of the wick 11 need only be sufficient to wet the inside circumference of the heat pipes 1 and not to lift liquid uphill more than a few inches. Thus, the gravity assisted heat pipes 1 can operate in only one direction, to transfer heat into the heat removal and storage means 7, but not out of it.

The collector 8 shown in FIG. 1 is comprised of two flat rectangular boxes, each with a solar heat absorber 6 with heat pipes 1, a transparent cover 9 on top, and thermal insulation 24 on the bottom and edges. The heat removal and storage means 7 is attached along the top of the collector 8, but it may also be located behind the collector 8 or at either side. A support structure 10 is built beneath the collector 8 and the heat removal and storage means 7 to hold them together and to hold the collector 8 in a proper orientation to receive the solar radiation.

Figure 2:
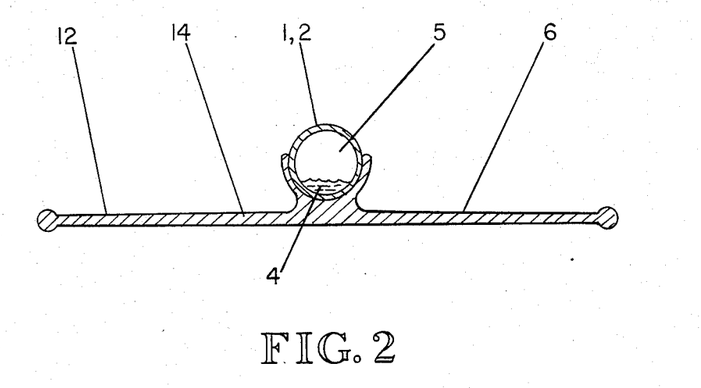
FIG. 2 is a cross-section drawing of one section of the solar heat absorber made of a separate extruded metal fin attached to a heat pipe.
Figure 3:
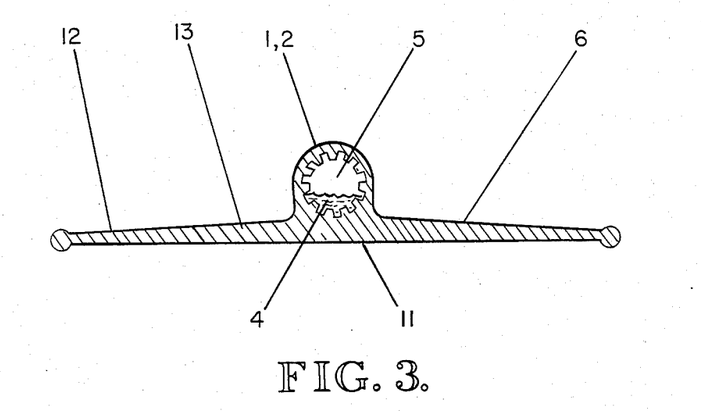
FIG. 3 is a cross-section drawing of one section of the solar heat absorber made of extruded metal with an axial grooved wick heat pipe formed within it.
Figure 4:
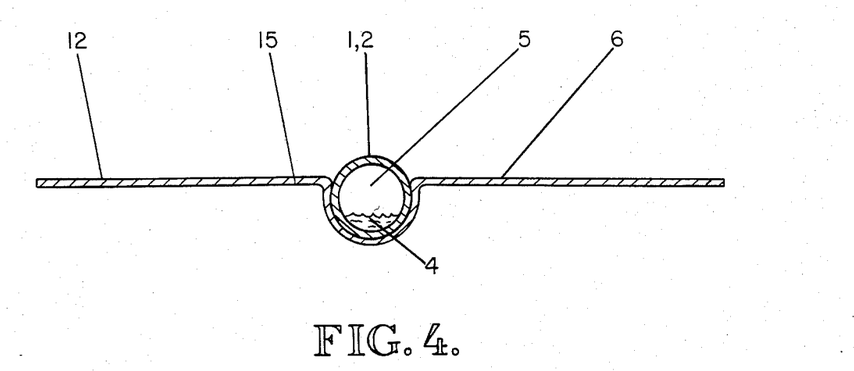
FIG. 4 is a cross-section drawing of one section of the solar heat absorber made of a separate metal fin made of a formed section of metal sheet attached to a heat pipe.

The two absorber 6 panels shown in FIG. 1 are each comprised of four heat pipes 1, each with a flat metal fin 12 attached. The metal fin 12 is made of a metal extrusion 14, also shown in FIG. 2, with a slot into which the heat pipe 1 is attached. Numerous absorber fin designs may be used. In FIG. 3, the absorber fin 12 is made of a metal extrusion 13 with an axial groove wick 11 formed inside the heat pipe 1. In FIG. 4, the absorber fin 12 is made of a formed metal sheet 15 that attaches snugly to the heat pipe 1. Two metal sheets 15 could be used, one on top and one on the bottom of the heat pipe 1.

Figure 5:
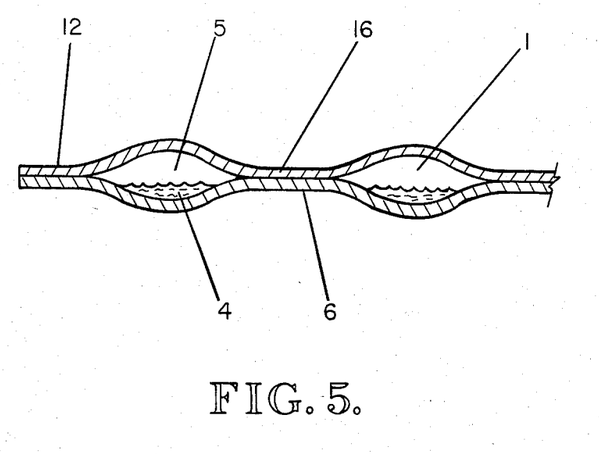
FIG. 5 is a cross-section drawing of the solar heat absorber made of bonded metal panels with heat pipes formed within it.
Figure 7:
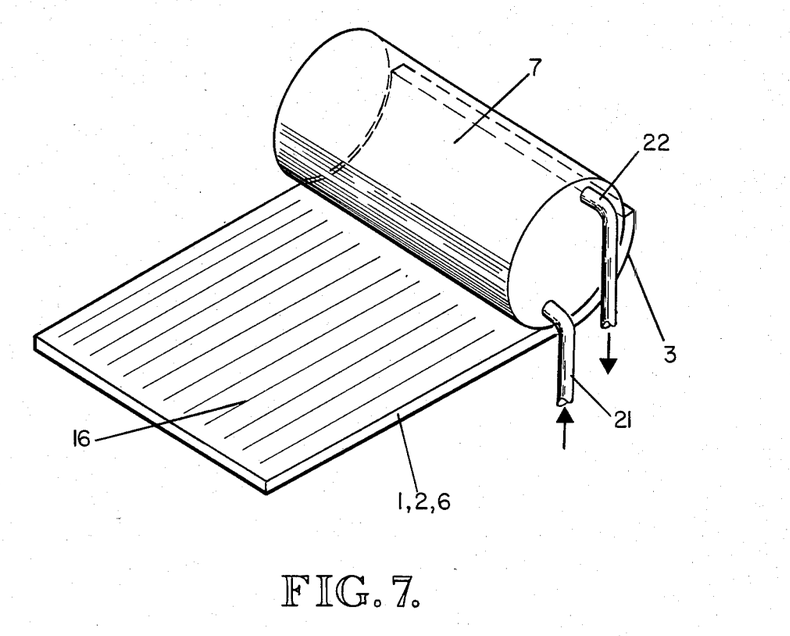
FIG. 7 is an isometric section drawing of the passive solar heat collector where a single bonded panel absorber is used with a heat storage tank attached along the length of the collector panel.
Figure 8:
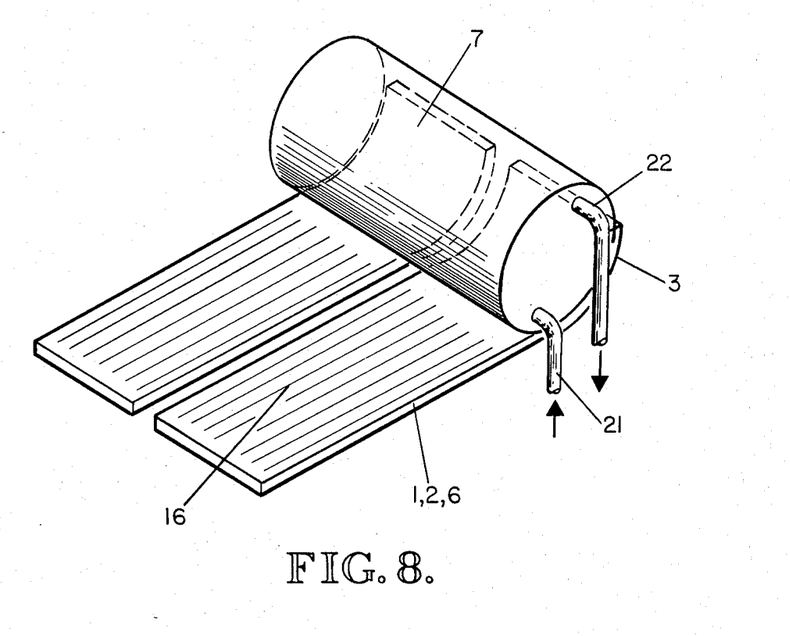
FIG. 8 is an isometric section drawing of the passive solar heat collector where two bonded panel absorbers are used with a heat storage tank attached at the top of the collector panels.

In FIG. 5, the absorber is made of two sheets of metal 12 bonded together into a panel 16 with heat pipes 1 formed in passages between the bonded sheets. In FIG. 7 the heat removal and storage means 7 is attached along the length of the bonded metal absorber panel 16. The collector cover and insulation are not shown in FIG. 7 in order to better show the absorber panel 16. In FIG. 8, two bonded panel heat pipes 1 comprise the bonded metal absorber panels 16 which attach beneath the heat removal and storage means 7 that is located at the top of the absorber panels 16.

Figure 6:
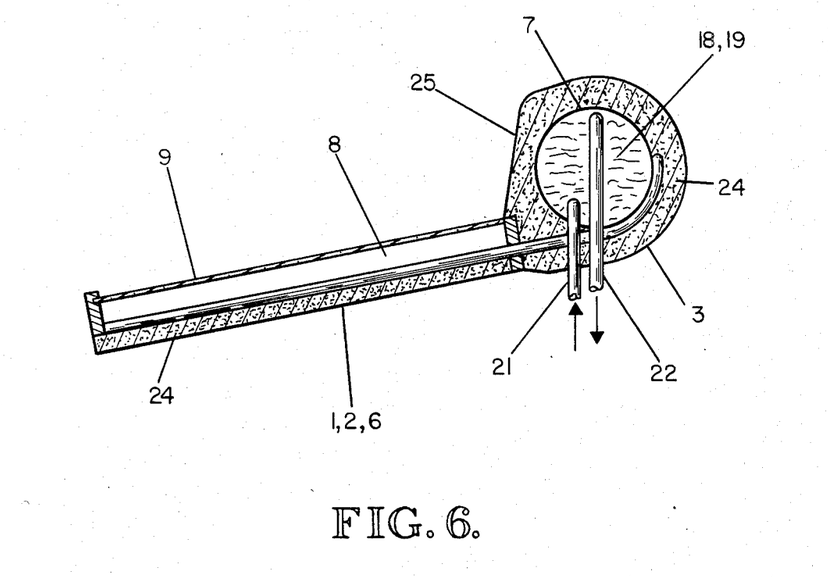
FIG. 6 is a cross-section side-view drawing of the passive solar heat collector system with the heat pipes bent around the outside of the storage tank.

FIG. 6 shows a cross-section side-view of the passive solar heating system where the condenser ends of the heat pipes are bent along the outside of the storage tank forming a close mechanical contact and good thermal conductivity thereto. Here the heat pipes 1 are shown in section with their evaporator ends 2 which serve as absorber 6 located in the collector 8 as usual. The transparent cover 9 is shown on the top of the collector 8 and thermal insulation 24 is shown on the bottom. The condenser ends 3 of the heat pipes 1 are shown attached around the bottom of the heat removal and storage means 7 to provide good heat transfer through a double wall heat exchanger to the substance inside. A flat fin 12 such as was shown in FIGS. 2, 3, and 4 may be used on the condenser ends 3 of the heat pipes 1 to enhance heat transfer to the tank. A thermally conducting joint compound or adhesive is used between the heat pipes and the tank to provide low thermal resistance. The heat removal and storage means 7 may be a tank of liquid 18 which stores sensible heat, or it may be a tank of phase change material 19, which stores latent heat of phase change. Also shown in FIG. 6 are the cold water inlet pipe 21 at the bottom of the tank and the hot water outlet pipe 22 at the top of the tank. Thermal insulation 24 is also provided around the tank. A reflective cover 25 is provided to surround and protect the insulation 24 and to reflect additional solar radiation onto the collector 8.

Figure 9:
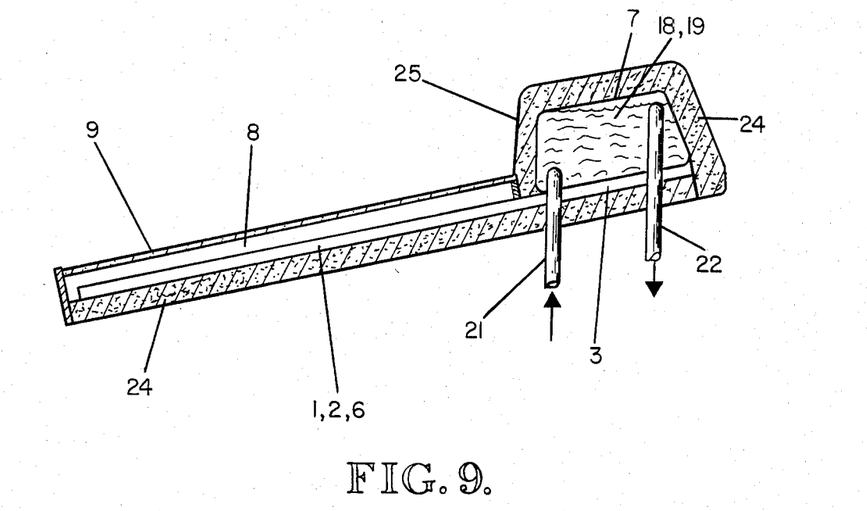
FIG. 9 is a cross-section side view drawing of the passive solar heat collection system with a rectangular heat storage tank and straight heat pipes.

In FIG. 9 a cross-section side-view of another version of the passive solar heating system is shown. Here the heat removal and storage means 7 is shown as a rectangular tank with the condenser ends 3 of straight heat pipes 1 laying flat against the tank in close mechanical contact and good thermal conductivity thereto. Everything else is the same as in FIG. 6.

Figure 10:
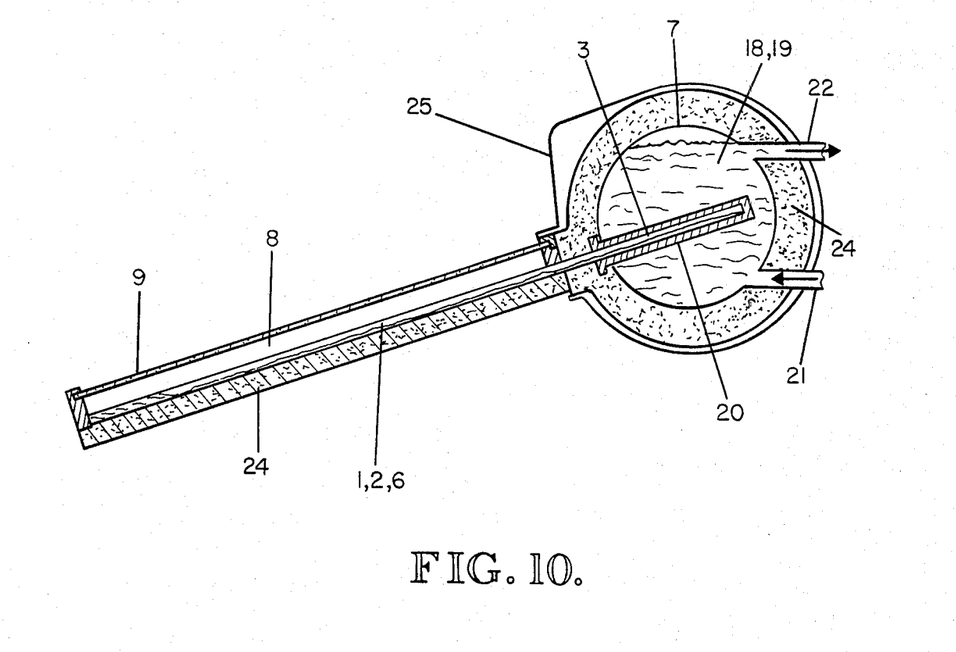
FIG. 10 is a cross-section side-view drawing of the passive solar heat collector system with straight heat pipes simply inserted into internal heat transfer tubes in the storage tank.

FIG. 10 is a cross-section side-view of another embodiment of the present invention using straight heat pipes 1 as were used in FIG. 9. Here the heat pipes 1 are shown in section with their evaporator ends 2 which serve as the absorber 6 located in the collector 8 as usual. The transparent cover 9 is shown on the top of the collector 8 and thermal insulation 24 is shown on the bottom. In this embodiment of my invention, the condenser ends 3 of the heat pipes 1 are simply inserted into sealed tubes 20 which enter the heat removal and storage means 7 thereby providing good heat transfer through a double wall heat exchanger to the substance inside. Again, as in FIGS. 1 and 6 and 7–10, simple mechanical contact between the condenser ends of the heat pipes and the heat removal and storage means provides adequate thermal conductivity to pass a significant amount of the heat brought to the condenser ends of the heat pipes to the heat removal and storage means at a rate commensurate with the rate at which heat is supplied to the evaporator ends of the heat pipes by the sun. A flat fin 12 such as was shown in FIGS. 2, 3, and 4 may be used on the condenser ends 3 of the heat pipes 1 to enhance heat transfer to the tank. A thermally conducting joint compound or adhesive is used between the heat pipes and the tank to provide low thermal resistance. The heat removal and storage means 7 may be a tank of liquid 18 which stores sensible heat, or it may be a tank of phase change material 19, which stores latent heat of phase change. The cold water inlet pipe 21 is at the bottom of the tank and the hot water outlet pipe 22 is at the top of the tank. Thermal insulation 24 is also provided around the tank. A reflective cover 25 is provided to surround and protect the insulation 24 and to reflect additional solar radiation onto the collector 8.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. A passive solar heating apparatus having at least one heat pipe with a first and a second end, with the first end serving as the heat absorber section located in a solar heat collector to absorb solar energy as heat and transfer it into the second end that serves as the heat removal section where an integral heat removal and storage means is attached to absorb and store the solar heat, wherein the passive solar heating apparatus comprises
   a. a collector with at least one transparent cover on the top surface, thermal insulation on the bottom and edges, and a structural frame to hold the collector together, said structural frame comprising a rectangular box;
   b. an absorber comprised of at least one heat pipe having sealed first and second ends, made from a hollow material capable of serving as a hermetically sealed vessel and having therein a volatile liquid that transfers heat by evaporation in the heated first end, said first end being located inside the collector to absorb solar heat, and condensation in the second end located outside of the collector where heat is removed, said absorber being tilted with the evaporator below the condenser so that condensate liquid will flow from the condenser to the evaporator by gravity and by surface tension forces and thereby provide one-directional heat transfer into the condenser but not out of it, said absorber being coated with an effective solar radiation absorber surface, each of said at least one heat pipe having externally an integrally extruded metal fin and internally an axially grooved wick lining on the inside wall to distribute the liquid to wet all of the internal surface for enhanced evaporation and condensation;
   c. an integral heat removal and storage means to remove and store heat, said internal heat removal and storage means having an insulated tank of liquid with the bottom thereof closely mechanically contacting with low thermal resistance the condenser on the second end of each of said at least one heat pipe, said insulated tank having a cold liquid inlet and a hot liquid outlet pipe so that the solar heat removed and stored may be transferred to liquid flowing into and out of said insulated tank, said insulated tank further having a cover over the insulation with the surface of the cover adjacent to the collector being a refective surface to reflect additional solar radiation onto the collector; and
   d. a support structure attached to said collector and to said integral heat removal and storage means to hold them together and in proper orientation to receive solar energy and to resist environmental effects.

2. A passive solar heating apparatus having at least one heat pipe with a first and a second end, with the first end serving as the heat absorber section located in a solar heat collector to absorb solar energy as heat and transfer it into the second end that serves as the heat removal section where an integral heat removal and storage means is attached to absorb and store the solar heat, wherein the passive solar heating apparatus comprises
   a. a collector with at least one transparent cover on the top surface, thermal insulation on the bottom and edges, and a structural frame to hold the collector together, said structural frame comprising a rectangular box;
   b. an absorber comprised of at least one heat pipe having sealed first and second ends, made from a hollow material capable of serving as a hermetically sealed vessel and having therein a volatile liquid that transfers heat by evaporation in the heated first end, said first end being located inside the collector to absorb solar heat, and condensation in the second end located outside of the collector where heat is removed, said absorber being tilted with the evaporator below the condenser so that condensate liquid will flow from the condenser to the evaporator by gravity and by surface tension forces and thereby provide one-directional heat transfer into the condenser but not out of it, said absorber being coated with an effective solar radiation absorber surface, each of said at least one heat pipe having externally an integrally extruded metal fin and internally an axially grooved wick lining on the inside wall to distribute the liquid to wet all of the internal surface for enhanced evaporation and condensation;

c. an integral heat removal and storage means to remove and store heat, said integral heat removal and storage means having an insulated tank of liquid connected to the condenser on the second end of each of said at least one heat pipe, said insulated tank having at least one sealed internal sleeve pipe mounted in its wall so that the second end of each absorber heat pipe may be inserted therein in close mechanical contact and with good thermal conductivity to provide a double wall heat exchanger, said insulated tank further having a cover over the insulation with the surface of the cover adjacent to the collector being a reflective surface to reflect additional solar radiation onto the collector; and d. a support structure attached to said collector and to said integral removal and storage means to hold them together and in proper orientation to receive solar energy and to resist environmental effects.

* * * * *